United States Patent [19]

Reynolds et al.

[11] Patent Number: 4,693,273

[45] Date of Patent: Sep. 15, 1987

[54] CONTROL VALVE

[75] Inventors: Desmond H. J. Reynolds; Phillip A. Taft, both of West Midlands, England

[73] Assignee: Lucas Industries Public Limited Company, Birmingham, England

[21] Appl. No.: 718,444

[22] Filed: Apr. 1, 1985

[30] Foreign Application Priority Data

Apr. 4, 1984 [GB] United Kingdom ............... 8408635

[51] Int. Cl.$^4$ ............................................. F15B 13/06
[52] U.S. Cl. ................................. 137/596.13; 60/418; 91/513; 137/116
[58] Field of Search ..................... 60/418; 137/596.13; 91/513

[56] References Cited

U.S. PATENT DOCUMENTS

| | | | |
|---|---|---|---|
| 3,225,781 | 12/1965 | Kruger | 137/596.13 X |
| 3,455,210 | 7/1969 | Allen | 137/596.13 X |
| 3,771,424 | 11/1973 | Allen et al. | 91/433 X |
| 3,924,655 | 12/1975 | Schwerin | 137/596.13 |
| 4,080,994 | 3/1978 | Flascher et al. | 137/596.13 |
| 4,099,541 | 7/1978 | Binkley et al. | 137/596.13 |
| 4,150,690 | 4/1979 | Heiser et al. | 137/596.13 |
| 4,244,278 | 1/1981 | Belart et al. | 251/63.4 X |
| 4,503,876 | 3/1985 | Farr | 137/116 X |

FOREIGN PATENT DOCUMENTS 1450557 8/1966 France .
2115894 9/1983 United Kingdom .

Primary Examiner—Gerald A. Michalsky
Attorney, Agent, or Firm—Holman & Stern

[57] ABSTRACT

A control valve for controlling the distribution of pumped hydrodynamic fluid to the trailer brakes of a tractor and trailer combination in response to hydrostatic pressure applied from the tractor braking system has an inlet for pumped fluid, a spool valve operable in response to a control piston to control the flow of pumped fluid to a first working trailer braking circuit through an outlet and to a tank, or reservoir, through an outlet, a flow control valve which provides a passageway communicating with a first flow path for pumped fluid to the spool valve and which is operable in response to pumped fluid pressure to control the flow of pumped fluid to a second working implement circuit through an outlet, and a second flow path for pumped fluid extending between the inlet and spool valve independent from and parallel with the first flow path, so that the spool valve controls the flow of pumped fluid through the second flow path to the fluid outlet leading to the trailer braking circuit.

14 Claims, 2 Drawing Figures

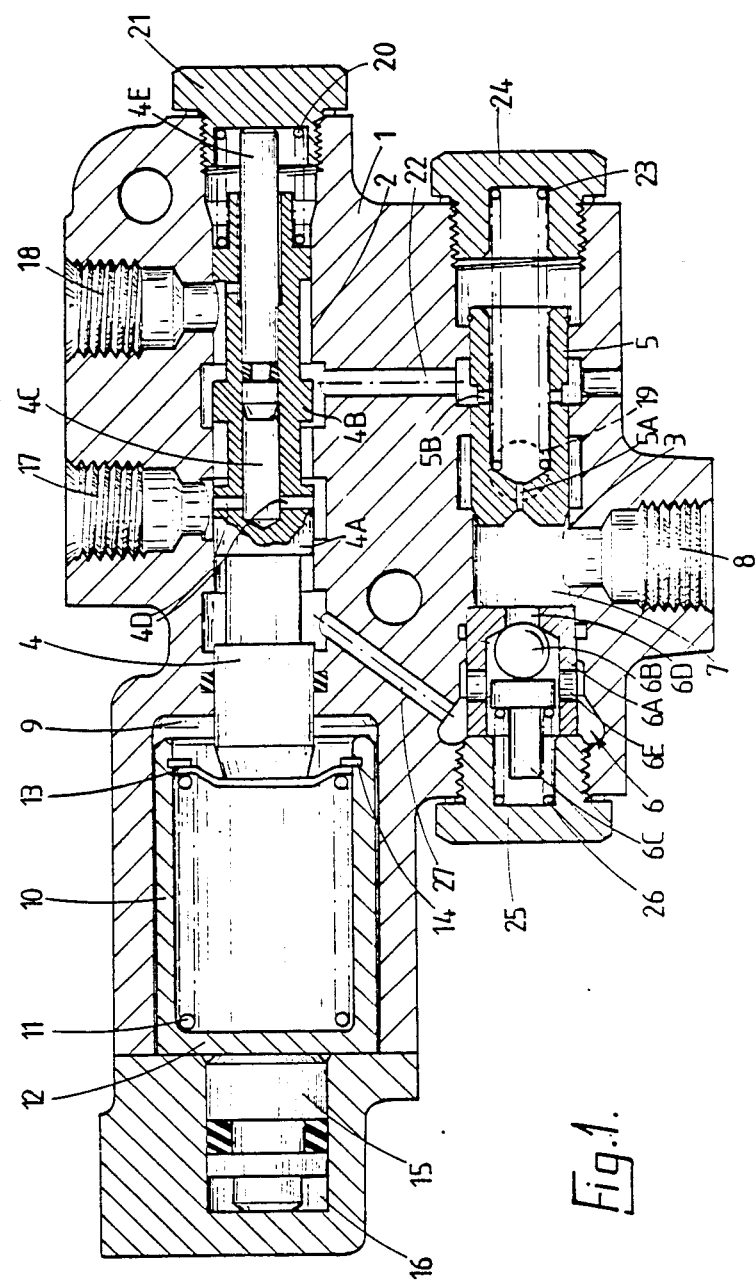

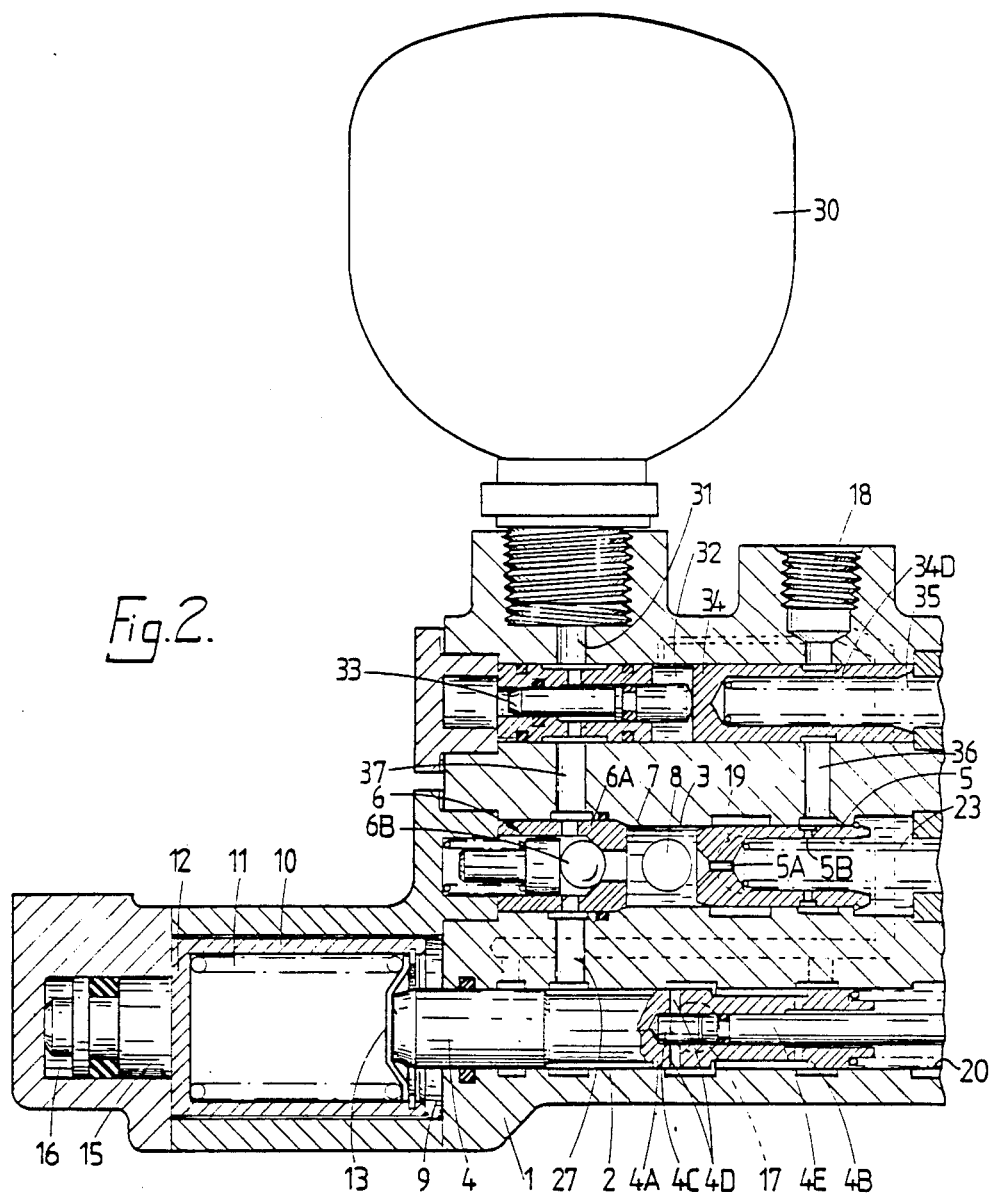

4,693,273

CONTROL VALVE

BACKGROUND OF THE INVENTION

1. Field of the Invention

This invention relates to a control valve operable to distribute hydrodynamic pumped fluid between a plurality of fluid paths under the influence of an applied external hydrostatic load and is particularly applicable in an agricultural tractor and trailer combination to the distribution of hydrodynamic fluid between a trailer braking circuit, an implements circuit and a fluid reservoir under the influence of the tractor hydrostatic braking system.

2. Description of the Prior Art

A system of this general kind is already known, for example, from French Pat. No. 1450557 in which a single spool valve distributes hydrodynamic pressure fluid between a trailer braking circuit, an implements circuit and a fluid reservoir under the influence of a pilot slave cylinder incorporated in the hydrostatic braking circuit of a tractor. In this prior system, the pump is required to work under load continuously, even when the required degree of trailer braking has been achieved. This can lead to overheating of the hydraulic fluid and also results in unnecessary pump wear.

In another prior proposal, illustrated in BRITISH PATENT SPECIFICATION No. GB 2115894A the aforesaid problems are overcome by arranging for the trailer braking circuit to be isolated once the desired degree of trailer braking is obtained, enabling the pump loading to be reduced under such conditions. However, this arrangement employs a flow controlled spool valve to control the distribution of pumped fluid between implements and the trailer brakes, while using another spool valve to control the flow of fluid to a reservoir in response to an input signal from a hydrostatic slave cylinder. The functions required by this arrangement give rise to a complicated and consequently expensive mechanism.

BRIEF SUMMARY OF THE INVENTION

An object of the invention is to provide a control valve capable of isolating the trailer braking circuit in the aforesaid manner but which is simpler in construction than the valve of No. GB 2115894A.

According to the invention, a control valve comprises an inlet for pumped fluid, a spool valve operable, in response to a control device, to control the flow of pumped fluid to a first working circuit a tank, a flow control valve providing a passage communicating with a first flow path for pumped fluid to the spool valve and operable, in response to the pumped fluid pressure, to control the flow of pumped fluid to a second working circuit, and a second flow path for pumped fluid extending between the pumped fluid inlet and the spool valve independent of and parallel with said first flow path, said spool valve controlling the flow of pumped fluid along said second flow path to said first working circuit.

Typically, said control device is a piston subject to hydrostatic pressure derived from an external pressure circuit, said piston preferably acting on said spool valve by way of a caged spring arranged to yield at a predetermined force applied by said piston to said spool valve and thereby permit the piston force to be reacted other than by the spool valve so as to limit the pressure applicable via the spool valve to said first working circuit.

In one convenient arrangement, a pressure accumulator and associated unloader valve mechanism are provided, said mechanism being responsive to pressure in the accumulator such that it isolates the flow control valve from the tank and thereby permits that valve to close off said second working circuit from the pumped fluid inlet until the accumulator pressure reaches a predetermined value.

BRIEF DESCRIPTION OF THE DRAWINGS

The invention will now be described, by way of example, with reference to the accompanying drawings wherein:

FIG. 1 is a diagrammatic cross sectional view of one form of the control valve of the invention; and FIG. 2 is a view similar to FIG. 1 illustrating an alternative embodiment.

DETAILED DESCRIPTION

Referring to FIG. 1, this illustrates a control valve which is particularly adapted to control the operation of the brakes on the trailer unit of an agricultural tractor and trailer combination by distributing hydrodynamic fluid, provided from a pump on the vehicle, between the trailer brake circuit, an implements circuit and a reservoir, such distribution being effected in response to pressure derived from the hydrostatic braking circuit of the tractor unit.

The control valve comprises a housing 1 in which a pair of parallel bores 2 and 3 are formed, the bore 2 containing a spool valve 4 and the bore 3 containing a flow valve 5 and a one-way valve 6 respectively at either side of a chamber 7 into which leads a pumped fluid inlet 8 connected to the vehicle pump. An enlarged portion 9 of the bore 2 at the left hand end thereof, as seen in the drawing, contains a sleeve 10 housing a spring 11 trapped between a closed end 12 of the sleeve and a washer 13 retained by a circlip 14, the washer engaging the adjacent end of the spool 4. The closed end 12 of the sleeve is engaged by a piston 15 slidable in a bore 16 under the action of hydrostatic pressure applied thereto from the tractor braking circuit. The bore 2 communicates with fluid outlets 17 and 18 respectively to the trailer braking circuit and a reservoir.

The spool 4 is provided with a pair of lands 4A and 4B which respesctively control fluid flow through the ports 17 and 18 in the manner to be described. This spool is also provided with a co-axial bore 4C communicating, via radial passages 4D, with the exterior of the spool and containing a piston 4E slidable therein. The spool 4 is urged in a direction towards the piston 15 by a spring 20 reacting against a plug 21 which closes the outer end of the bore 2.

The flow valve 5 has a restricting orifice 5A formed through its end adjacent the chamber 7 and has radial passages 5B providing communication between the interior of the flow valve and a passage 22 in the body 1 which interconnects the bores 2 and 3. The spool valve 5 is urged in a direction towards the chamber by a spring 23 reacting against a plug 24 closing the adjacent end of the bore 3. The bore 3 communicates with a port 19 leading to an implements circuit and flow of pumped fluid to that circuit from the chamber 7 is controlled by the flow valve 5 in the manner to be described.

The one-way valve 6 consists of a valve body 6A retained within the housing 1 by a plug 25 closing the adjacent end of the bore 3. The valve body contains a valve member in the form of a ball 6B which is engaged by a pusher 6C and is urged via the pusher, by a spring 26, into engagement with a seat surrounding a port 6D formed through the valve body 6A and communicating with the chamber 7. The valve body 6A is provided with radial ports 6E placing the port 6D in communication with a passage 27 leading to the bore 2 at the left hand side of the land 4A of the spool 4.

In a first mode of operation, in which the tractor brakes are inoperative and there is therefore no pressure from the tractor brake circuit in the cylinder 16, but various components of the valve will commence in their illustrated positions. Pumped fluid enters the inlet 8, passes through the flow valve restricting orifice 5A, through the flow valve itself and passage 22 into the bore 2. With the spool valve 4 in the position illustrated the pump fluid is able to flow from the valve to the reservoir through port 18. The pressure drop which occurs across the restricting orifice 5A causes the flow valve 5 to move to the right against the action of the spring 23, thereby opening the port 19 and permitting pumped fluid to flow to the implement circuit. Because of the positions of the lands 4A and 4B of the spool valve 4, the trailer brake circuit is in communication with the reservoir and cannot be pressurized.

When the tractor brakes are operated with only minimal pressure present in the implements circuit, hydrostatic tractor brake pressure is applied to the piston 15 and the force thereof is transmitted by the sleeve 12 and caged spring 11 to the control valve spool 4 which moves to the right, causing the land 4A to isolate the port 17 from the outlet port 18 to the reservoir. Further movement of the spool 4 to the right opens the trailer brakes port 17 to pump pressure at the left hand side of the land 4A and the spool finally, after further movement, assumes a position in which the land 4B closes off the outlet port 18 to the reservoir from the passage 22. This action has the effect of removing the pressure drop across the orifice 5A, allowing the compresssion spring 23 to move the flow valve 5 leftwards to the position shown in which it once again isolates the implements circuit port 19 from the chamber 7 and thus from the inlet port 8.

Pressure can build up in the chamber 7, causing the non-return valve 6B to open in order to permit the flow of pumped fluid along the passage 27, past the land 4A and through the port 17 to the trailer brakes circuit. The pressure built up in the trailer brakes circuit is communicated through the passages 4D to the bore 4C in which it acts upon the piston 4E, creating a force reinforcing the action of the spring 20, tending to move the spool 4 to the left against the action of the caged spring 11. When this force becomes sufficiently large, the spool 4 moves to the left and the land 4A once more isolates the outlet port 17 to the trailer brake circuit from the pumped fluid flowing along passage 27. Corresponding movement of the land 4B re-establishes communication between the ports 8 and 18 through the control valve 5, which in turn recreates the pressure drop across the orifice 5A, thereby placing the implement circuit once again in communication with the flow of pumped fluid. When this happens, the pump pressure reduces to the circulation pressure existing bfore actuation of the tractor brakes.

Since the trailer brake circuit is isolated from the flow of pumped fluid, the trailer brake circuit pressure remains at the level existing when the port 17 was last closed by the land 4A and remains at this level until the pressure upon the piston 15 is either reduced or exhausted. In either of these circumstances, the spool 4 moves further to the left to re-establish communication between the ports 17 and 18, enabling the trailer brake pressure to be reduced to a level corresponding to the existing tractor brake pressure, at which point the spool 4 will move once more to the right to enable the land 4A to re-isolate the trailer brake circuit. If the pressure acting on piston 15 has been exhausted, the spool 4 will move to its most leftward position under the action of the spring 20 and the trailer brake circuit will be completely exhausted.

If it is required to apply the trailer brakes during such time as the pump is already supplying the implements through port 19, the sequence of operations within the valve is similar to that described above, up to the point when the spool 4 moves leftwards to isolate the trailer brakes. If at this stage, the pressure existing in chamber 7, as determined by the flow required to the implements circuit, is insufficient to achieve the required degree of trailer braking, the spool 4 will remain in a position such that the land 4B isolates the port 18 from the flow valve, for a sufficient length of time for the latter to move leftwards and isolate the implements circuit, allowing the pressure in chamber 7 to rise sufficiently to meet the required pressure demand in the trailer brake circuit.

The use of the caged spring 11 to transmit the input pressure from the tractor brakes to the spool valve ensures that the spool 4 will only respond to the pressure on the piston 15 up to a maximum set by the force of the spring 11, after which the spring yields, enabling the sleeve 10 to move into abutment with the housing so as to transmit any excess pressure from the piston 15 to the housing. This is necessary in order to ensure that the implements circuit does not become permanently starved of pressure during trailer brakes actuation.

As an additional safety measure, an accumulator may be provided and arranged to be charged with pump pressure so that, in the event that the pump output flow is interrupted, as for example by stalling of the tractor engine, the trailer brakes may still be operated by accumulator pressure. The embodiment illustrated in FIG. 2 shows one arrangement enabling such a facility to be provided. Many of the components in the FIG. 2 arrangement are equivalent to those shown in FIG. 1 and are given, where appropriate, the same reference numerals.

When the tractor engine is first started, the first action required is that of charging the accumulator 30. The accumulator communicates, via a port 31 of the body with an additional bore 32 within which slide a pair of pistons 33 and 34 which are urged to the left, as seen in the drawing, by a spring 35 acting on the piston 34. During charging of the accumulator, the spring 35 moves the pistons to the left away from the positions shown so that the land 34D of the piston 34 moves across the reservoir outlet 18 to prevent communication between that outlet and the interior of the flow valve 5, which normally takes place via a passage 36. Because of the presence of the restricting orifice 5A a pressure balance now builds up across this orifice and the spring 23 urges the flow valve to the left to close off the implements circuit port 19 and thus divert the full pump flow from the inlet port 8 past the ball valve 6B and through the passage 37 to the accumulator 30. Pressure built up in the accumulator acts on the piston 33 and urges this piston and the piston 34 to the right to the position shown in FIG. 2 against the action of the spring 35 to re-open the interior of the flow valve 5 to the reservoir. When this happens, the ball valve 6B closes and the pump flow is directed either to the reservoir or to the implements via the flow valve. The operation of this embodiment under the action of the hydrostatic piston 15 is similar to that of the FIG. 1 embodiment except that reservoir outlet 18 is controlled by accumulator pressure acting through pistons 33 and 34 rather than by spool valve 4. With the accumulator charged as stated above, the trailer brake pressure is supplied from the charged accumulator. As the brakes are actuated by piston 15, spool valve 4 is urged to the right, land 4A opens bore 2 at its left to port 17 and thereby allows accumulator pressure via passages 31, 37, 27 and bore 2 to operate the trailer brakes through port 17. As the accumulator pressure diminishes reducing its pressure piston 33, the latter is moved to the left with piston 34 by spring 35 and land 34D closes outlet 18, thereby preventing fluid flow through orifice 5A and the pressure drop therethrough so that valve 5 moves to the left under the force of spring 23 closing port 19. Full pump flow opens ball valve 6B and recharges the accumulator.

In the event of a failure in pump pressure delivery to the inlet port 8, the ball valve 6B closes and the flow valve is urged by spring 23 to close off the implements circuit. Pressure is then applied from the accumulator via passages 37, 31, 27 and to the spool valve 4 and bore 2 thereof to enable trailer braking to take place when valve 4 is moved to the right, as before. Resumption of pump flow will re-charge the accumulator in the manner described above.

We claim:

1. A control valve comprising:
a housing;
an inlet in said housing for pumped fluid under pressure;
a control device;
a first outlet in said housing for connection to a first working circuit;
a second outlet in said housing for connection to a tank;
a spool valve in said housing operable in response to said control device for controlling flow of said pumped fluid to said first and second outlets;
a supply port in said housing for connection to a second working circuit;
a flow control valve for controlling flow of said pumped fluid from said inlet to said supply port in response to the pressure of said pumped fluid;
a first flow channel in said housing for said pumped fluid extending between said flow control valve and said spool valve;
a second flow channel in said housing for pumped fluid extending between said inlet and said spool valve independently of and parallel to said first flow channel; and
a passageway through said flow control valve for communicating said inlet with said first flow channel so that said flow control valve can close said supply port while maintaining pumped fluid flow to said first flow channel for precluding pumped fluid flow to said second working circuit when the pressure of said pumped fluid supplied to said first outlet is less than a predetermined value; said spool valve being adapted to control the flow of pumped fluid from said second flow channel to said first outlet.

2. A control valve as claimed in claim 1 wherein said control device comprises:
a piston subject to hydrostatic pressure derived from an external pressure circuit.

3. A control valve as claimed in claim 2 and further comprising:
a caged spring in said housing operatively arranged between said spool valve and said piston to yield at a predetermined force applied by said piston through said caged spring to said spool valve and thereby permit the piston force to be reacted upon other than by the spool valve to limit the pressure of the pumped fluid applicable via the spool valve to said first working circuit.

4. A control valve as claimed in claim 3 and further comprising:
a one-way valve disposed in said housing between the pumped fluid inlet and said spool valve and operable to control flow of pumped fluid from said inlet to said spool valve through said second flow channel.

5. A control valve as claimed in claim 1 and further comprising:
a one-way valve disposed in said housing between the pumped fluid inlet and said spool valve and operable to control flow of pumped fluid from said inlet to said spool valve through said second flow channel.

6. A control valve as claimed in claim 5 wherein:
said one-way valve is disposed between said pumped fluid inlet and the end of the second flow channel remote from said spool valve.

7. A control valve as claimed in claim 6 wherein:
said flow control valve is spring-urged towards a position in which it prevents fluid flow through said supply port communicating with said second working circuit; and
said passageway through said flow control valve comprises a restricting orifice means across which flow of pumped fluid through the valve produces a pressure drop which moves the valve in a direction to open said supply port communicating with second working circuit.

8. A control valve as claimed in claim 1 wherein:
said flow control valve is spring-urged towards a position in which it prevents fluid flow through said supply port communicating with said second working circuit; and
said passageway through said flow control valve comprises a restricting orifice means across which flow of pumped fluid through the valve produces a pressure drop which moves said flow control valve in a direction to open said supply port communicating with said second working circuit.

9. A control valve as claimed in claim 6 wherein:
said spool valve has an internal axial bore;
a piston is provided in said bore; and
a further channel is provided between said axial bore and said first outlet so that said piston is subject to pressure in said first working circuit and acts, under the influence of said pressure in said first working circuit, to move the spool valve to interrupt said fluid flow to said first outlet when said pressure reaches a predetermined value.

10. A control valve as claimed in claim 1 wherein:

said spool valve has an internal axial bore;

a piston is provided in said bore; and a further channel is provided between said axial bore and said first outlet so that said piston is subject to pressure in said first working circuit and acts, under the influence of said pressure in said first working circuit, to move the spool valve to interrupt said fluid flow to said first outlet when said pressure reaches a predetermined value.

11. A control valve as claimed in claim 10 wherein:

said spool valve is spring-urged into co-action with said control device and the action of said piston reinforces said spring-urged action.

12. A control valve as claimed in claim 11 wherein:

said spool and flow control valves are slidable in bores in said housing and each of said first and second flow channels extends respectively between said bores.

13. A control valve as claimed in claim 1 wherein:

said spool and flow control valves are slidable in bores in said housing and each of said first and second flow channels extends respectively between said bores.

14. A control valve as claimed in claim 1 wherein:

said control device comprises a hydrostatic device actuated by a vehicle braking system;

said first working circuit comprises a trailer braking circuit;

said second working circuit comprises an auxiliary implements working circuit; and said predetermined value comprises the pressure of said pumped fluid in said trailer braking circuit which is equivalent at least to the trailer braking requirements.

* * * * *